(12) United States Patent
Ohtake

(10) Patent No.: US 8,448,081 B2
(45) Date of Patent: May 21, 2013

(54) INFORMATION PROCESSING APPARATUS

(75) Inventor: Toshifumi Ohtake, Chofu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 73 days.

(21) Appl. No.: 13/044,294

(22) Filed: Mar. 9, 2011

(65) Prior Publication Data
US 2011/0225535 A1 Sep. 15, 2011

(30) Foreign Application Priority Data

Mar. 9, 2010 (JP) ................................. 2010-051894

(51) Int. Cl.
G06F 3/048 (2006.01)

(52) U.S. Cl.
USPC ........... 715/773; 715/765; 715/864; 715/815; 345/173; 345/168

(58) Field of Classification Search
USPC ................ 715/700, 764, 765, 768, 773, 835, 715/864, 810, 815; 345/156, 168, 169, 173
See application file for complete search history.

(56) References Cited

U.S. PATENT DOCUMENTS

| 5,936,614 | A | 8/1999 | An et al. | |
| 6,401,065 | B1 * | 6/2002 | Kanevsky et al. | 704/256.4 |
| 2007/0013673 | A1 | 1/2007 | Minari | |
| 2009/0046065 | A1 * | 2/2009 | Liu et al. | 345/168 |
| 2010/0131880 | A1 * | 5/2010 | Lee et al. | 715/769 |
| 2010/0287154 | A1 * | 11/2010 | Tee et al. | 707/708 |
| 2011/0018812 | A1 * | 1/2011 | Baird | 345/173 |
| 2011/0095986 | A1 * | 4/2011 | Aono et al. | 345/168 |
| 2011/0115722 | A1 * | 5/2011 | Mok | 345/173 |
| 2011/0214053 | A1 * | 9/2011 | Scott et al. | 715/259 |
| 2011/0219302 | A1 * | 9/2011 | Kondo et al. | 715/702 |

FOREIGN PATENT DOCUMENTS

| JP | H02-287814 | 11/1990 |
| JP | 5-108232 | 4/1993 |
| JP | 7-117868 | 4/1993 |
| JP | H11-327765 | 11/1999 |
| JP | 2004-070735 | 3/2004 |
| JP | 2007-025808 | 2/2007 |

OTHER PUBLICATIONS

Notification of Reason for Refusal mailed by the Japan Patent Office on May 17, 2011 in corresponding Japanese app. No. 2010-051894 in 5 pages.

* cited by examiner

Primary Examiner — Xiomar L Bautista
(74) Attorney, Agent, or Firm — Knobbe, Martens, Olson & Bear LLP

(57) ABSTRACT

An information processing apparatus includes: a reception module configured to receive an operation input by a user; and a display module configured to display key images for receiving the operation, wherein the display module is configured to operate to: display a first key image group comprising one or more key images, a second key image group comprising one or more key images in a first display mode, and a first display switching key image; and display the second key image group in a second display mode which is larger in size than the second key image group in the first display mode, without displaying the first key image group, when the operation on the first display switching key image is received by the reception module.

12 Claims, 7 Drawing Sheets

US 8,448,081 B2

INFORMATION PROCESSING APPARATUS

CROSS-REFERENCE TO THE RELATED APPLICATION(S)

The present application is based upon and claims priority from prior Japanese Patent Application No. 2010-051894, filed on Mar. 9, 2010, the entire contents of which are incorporated herein by reference.

FIELD

Embodiments described herein generally relate to an information processing apparatus.

BACKGROUND

A software keyboard technique is known in which a keyboard image is displayed on a display device such as an LCD and key codes are input to a program such as an OS according to user operations on the keyboard image.

For example, one technique relating to the software keyboard is available which allows the user of a computer system to design a touch-operated keyboard displayed on a display screen without the need for writing codes. A publication JP-A-5-108232 (counterpart U.S. publication is: U.S. Pat. No. 5,936,614) discloses a touch-operated keyboard defining method in which a keyboard editor produces a keyboard display space and the user forms a keyboard image in this display space and determines computer system actions to be carried out when respective keys are touched.

Where the display area of a display device is small, a keyboard image displayed on the display device is also small and it may be difficult for the user to make an operation. One countermeasure would be that a keyboard image in which images of low-use-frequency keys are not displayed is formed using, for example, the technique described in JP-A-5-108232, and images of high-use-frequency keys are displayed in an enlarged manner on a display device. However, the user operability may be lowered in that it may be difficult for a user to use the non-displayed keys.

BRIEF DESCRIPTION OF THE DRAWINGS

A general configuration that implements the various features of the present invention will be described with reference to the drawings. The drawings and the associated descriptions are provided to illustrate embodiments of the invention and not to limit the scope of the invention.

DETAILED DESCRIPTION

Figure 1A:
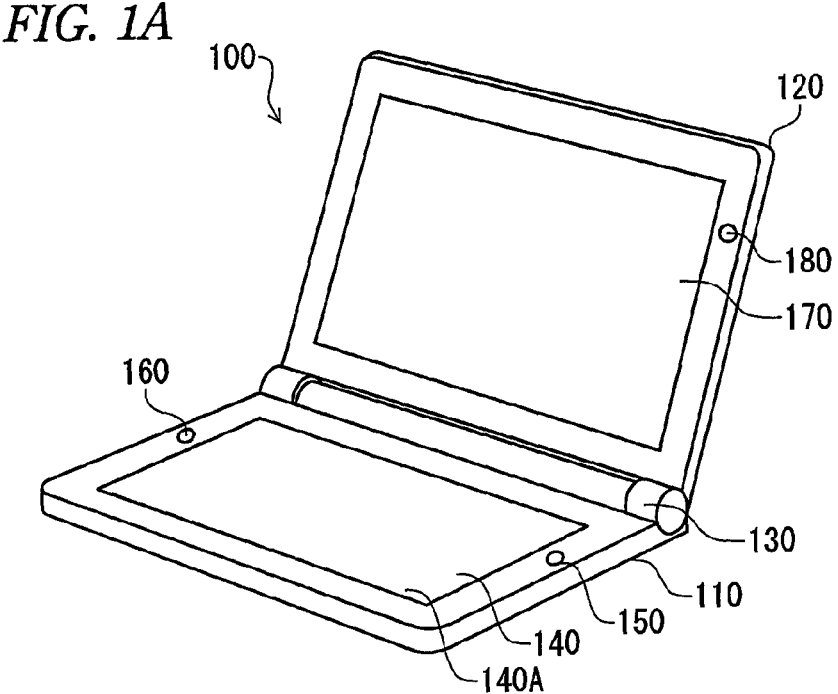
FIGS. 1A and 1B show an appearance of a computer according to an embodiment of the present invention.

According to the embodiments described herein, there is provided an information processing apparatus including: a reception module configured to receive an operation input by a user; and a display module configured to display key images for receiving the operation, wherein the display module is configured to operate to: display a first key image group comprising one or more key images, a second key image group comprising one or more key images in a first display mode, and a first display switching key image; and display the second key image group in a second display mode which is larger in size than the second key image group in the first display mode, without displaying the first key image group, when the operation on the first display switching key image is received by the reception module.

Embodiments according to the present invention will be described in detail with reference to the accompanying drawings. The scope of the claimed invention should not be limited to the examples illustrated in the drawings and those described in below.

Figure 1B:
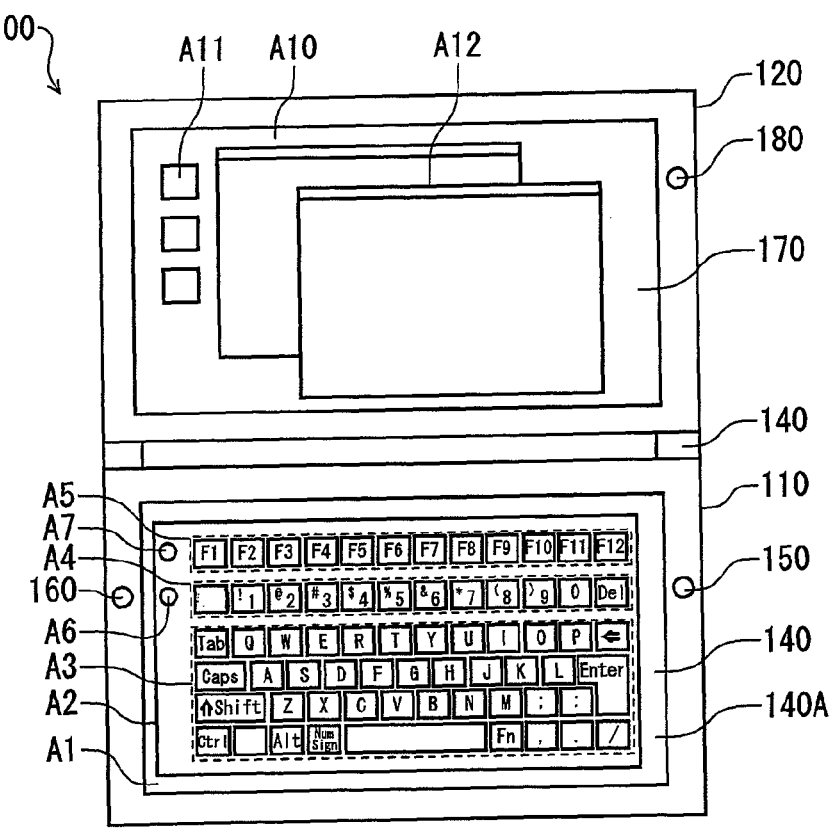

FIGS. 1A and 1B show an appearance of an information processing apparatus according to the embodiment, which is a battery-drivable computer 100.

FIG. 1A is a perspective view showing a state that a display unit 120 of the computer 100 is opened. The computer 100 is provided with a main unit 110 and the display unit 120 which are connected to each other by hinges 130. The main unit 110 is equipped with buttons 150 and 160 and a display device (LCD) 140 which is incorporated in the main unit 110 so as to be exposed on a top surface. The display unit 120 is equipped with a display device (LCD) 170 and a power button 180.

The main unit 110 has a thin, box-shaped case. The display device (LCD) 140 is incorporated in the main unit 110 so as to be exposed on a top surface. The top surface of the LCD 140 is provided with a transparent touch screen 140A, and the display device 140 and the touch screen 140A thus configured as a touch screen display. The touch screen display detects a touch region (also called a touch position), touched by a pen or a finger, on the display screen.

The buttons 150 and 160 are button switches which are assigned arbitrary functions, respectively, and are disposed on both sides of the display device 140 in the top surface of the main unit 110. For example, the button 150 can be used as a button switch for activating a key input control program which is an application program for performing a control relating to a key input operation on a software keyboard. In this case, the key input control program is activated when the button 150 is operated by the user. Alternatively, the key input control program may be activated when the button 160 is operated.

The display unit 120 has a thin, box-shaped case, and a bottom end portion of the display unit 120 is attached to a rear end portion of the main unit 130 via the hinges 130 so that the display unit 120 is rotatable.

The display device (LCD) 170 is a display incorporated in the display unit 120. As in the LCD 140, the top surface of the LCD 170 is provided with a touch screen 170A and a touch screen display function is thereby realized.

The power button 180 is a button switch disposed on the right of the LCD 170 in the top surface of the display unit 120, and receives an operation for powering on or off the computer 100.

Next, a keyboard image to be displayed by the computer 100 according to the embodiment will be described with reference to FIG. 1B.

For example, the LCD 140 which is provided in the main unit 110 of the computer 100 according to the embodiment is used for presenting a software keyboard image. For example, a keyboard window area A2, main key rows A3, a numeral key row A4, a function key row A5, display switching keys A6 and A7, etc. are displayed on a screen A1 of the LCD 140. The LCD 170 can be used as a display for displaying, for example, any of various application windows, and icons A11, application windows A12, etc. are displayed on a screen A10 of the LCD 170. In the computer 100 according to the embodiment, the touch screen 170A receives operations on a keyboard image displayed on the LCD 140, whereby various code data (key codes, character codes, commands, etc.) can be output to the application of an application window, for example, displayed on the LCD 140.

Furthermore, in the computer 100 according to the embodiment, the user operability can be increased by performing image switching (e.g., the numeral key row A4 or the function key row A5 is rendered in a non-display state) when the display switching key A6 or A7 is operated. Details will be described later with reference to FIGS. 2-7.

Figure 2:
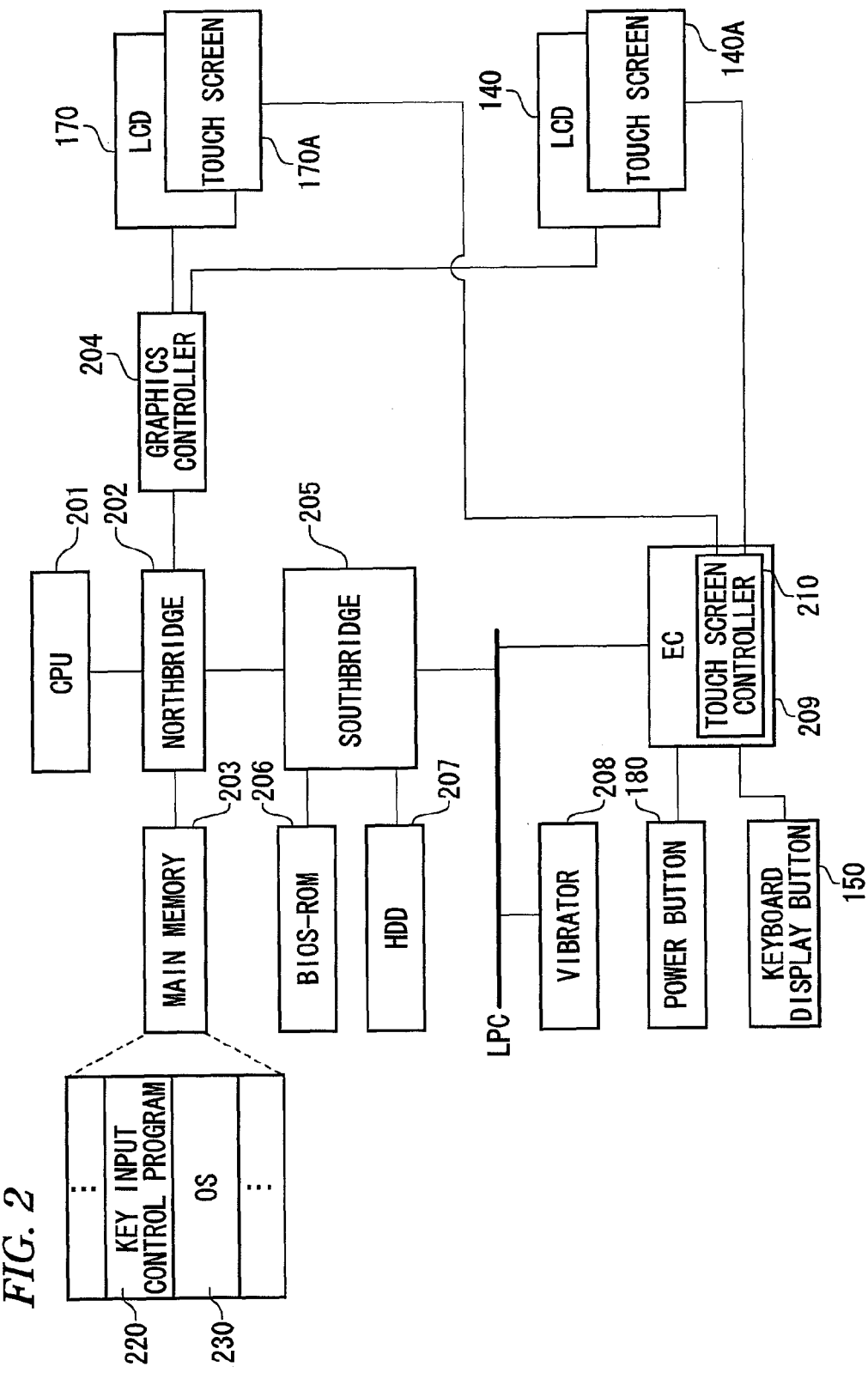
FIG. 2 is a bock diagram showing the system configuration of the computer according to the embodiment of the invention.

Next, the system configuration of the computer 100 will be described with reference to FIG. 2.

The computer 100 is equipped with a CPU 201, a northbridge 202, a main memory 203, a graphics controller 204, a southbridge 205, a BIOS-ROM 206, a hard disk drive (HDD) 207, a vibrator 208, an embedded controller (EC) 209, etc.

The CPU 201 is a processor for controlling operations of the computer 100 and runs an operating system (OS) 230, various application programs such as a key input control program 220, and other programs that are read into the main memory 203 from the HDD 207.

The CPU 201 also has a function of running a system BIOS (basic input/output system) which is a program that is stored in the BIOS-ROM 206 and serves to control the hardware of the computer 100.

The northbridge 202 is a bridge device that connects a local bus of the CPU 201 and the southbridge 205. The northbridge incorporates a memory controller for access-controlling the main memory 203.

The main memory 203 is a temporary storage area into which the OS 230 and any of various applications to be run by the CPU 201 are read. That is, the OS 230 and any of various programs such as the input control program 220 are read into the main memory 203 from the HDD 207.

The graphics controller 204 is a display controller for controlling the two LCDs 140 and 170 which are used as displays of the computer 100. The graphics controller 204 performs display processing (graphics computation) for drawing display data in a video memory (VRAM) according to a drawing request that is input from the CPU 201 via the northbridge 202. The video memory has a storage area for storing display data corresponding to an image to be displayed on the LCD 140 and a storage area for storing display data corresponding to an image to be displayed on the LCD 170.

The southbridge 205 incorporates an IDE (integrated drive electronics) controller for controlling the HDD 207 and a serial ATA controller.

The vibrator 208 is a device for vibrating the computer 100. The vibrator 208 vibrates the computer 100 according to an instruction from the key input control program 220 (described later with reference to FIG. 3). The vibrator 208 can generate different modes of vibration according to respective keys touched.

The embedded controller 209 (EC) 209 has a function of powering on or off the computer 100 in response to an operation of the power button 180 by the user. The embedded controller 209 includes a touch screen controller for controlling the touch screens 140A and 170A which are attached to the respective LCDs 140 and 170.

Each of the touch screens 140A and 170A is of a resistive film type or a capacitance type, for example, and is configured so as to detect a touch region (touch position) on itself (on the touch screen display).

Figure 3:
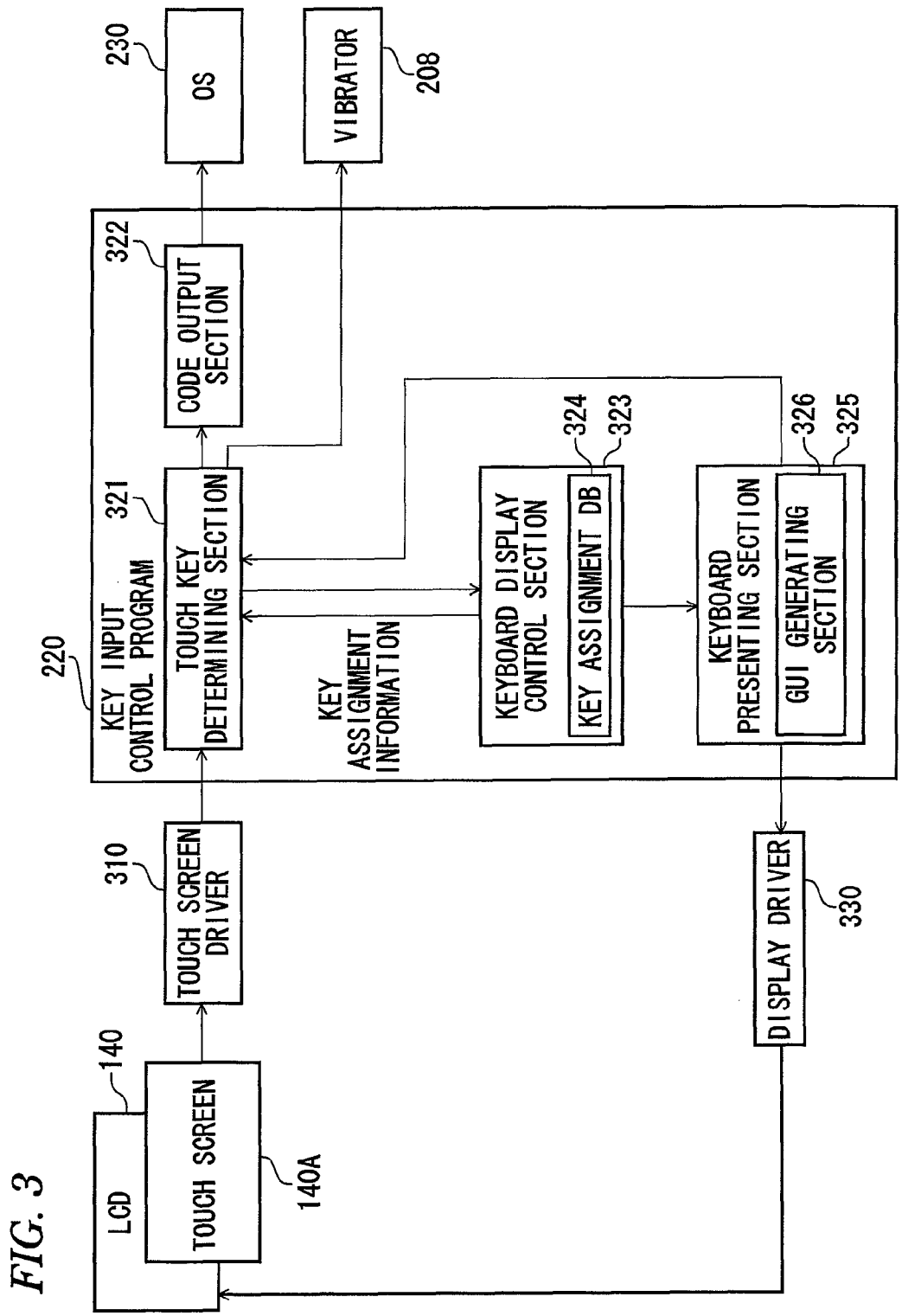
FIG. 3 shows functional blocks of a key input control program used in the embodiment of the invention.

Next, functional blocks of the key input control program 220 will be described with reference to FIG. 3.

The key input control program 220 is provided with a touch key determining section 321, a code output section 322, a keyboard display control section 323, and a keyboard presenting section 325.

The touch key determining section 321 receives touch region detection information from a touch screen driver 310 when the touch screen 140A has received a touch operation and detected its touch region. The touch region detection information contains coordinate data indicating a touch region (touch position), touched by an external thing (e.g., a pen or a finger of the user), of the touch screen 140A.

The touch key determining section 321 determines what key has been touched by the user based on the touch region detection information, window information that is input from the keyboard presenting section 325, and key assignment information that is input from the keyboard display control section 323.

More specifically, the touch key determining section 321 acquires touch region detection information containing coordinate information of a touched region of the touch screen 140A, window information which is coordinate information indicating a position, a size, etc. of a keyboard window being displayed on the LCD 140, and key assignment information which is coordinate information indicating what keys are assigned to respective regions of the keyboard window. The touch key determining section 321 determines what key a received operation corresponds to by comparing the coordinate information of the touch region detection information with the sets of coordinate information of the window information and the key assignment information.

If determined that a touch operation of a key, not a display switching key, of the software keyboard has been received, the touch key determining section 321 notifies each of the code output section 322 and the keyboard display control section 323 of the touch-operated key.

On the other hand, if determined that a touch operation of a display switching key of the software keyboard has been received, the touch key determining section 321 notifies the keyboard display control section 323 of the operated display switching key.

If determined that a touch operation of a key image of the software keyboard, the touch key determining section 321 instructs the vibrator 208 to generate vibration in a mode corresponding to the operated key.

When notified of a touch-operated key by the touch key determining section 321, the code output section 322 outputs a code corresponding to the operated key to the OS 230.

When notified of a touch-operated display switching key by the touch key determining section 321, the keyboard display control section 323 outputs key assignment information to the touch key determining section 321 based on the notice and instructs the keyboard presenting section 325 to switch the keyboard image for display. When informed of a touch-operated key by the touch key determining section 321, the keyboard display control section 323 instructs the keyboard presenting section 325 to switch the display mode of the image of the operated key.

The keyboard display control section 323 has a key assignment database 324, which is a database of pieces of key assignment information each of which indicates, using coordinate data or the like, what keys are arranged at respective positions of a keyboard window to be displayed on the LCD 140. Each piece of key assignment information indicates key positions in the form of sets of coordinates with respect to a reference point that is the bottom-left corner, the top-left corner, or the like of the corresponding keyboard window. Coordinates indicating each key may be relative ones that vary depending on the position of the keyboard window. If the size of a keyboard window is changed, the coordinates indicating each key are changed so as to be suitable for a new size.

The keyboard presenting section 325 displays a software keyboard on the LCD 140 via a display driver 330. The keyboard presenting section 325 is provided with a GUI generating section 326. When receiving a keyboard image switching instruction from the keyboard display control section 323, the GUI generating section 326 generates a keyboard image according to the received instruction. When receiving an instruction to change the display mode of a operated key from the keyboard display control section 323, the GUI generating section 326 generates a keyboard image in which the display mode of the image of the operated key is changed. The keyboard presenting section 325 outputs data of a keyboard window including the generated keyboard image to the display driver 330 and thereby displays the keyboard window on the LCD 140.

In addition to outputting the data of a keyboard window to the display driver 330, the keyboard presenting section 325 outputs window information indicating a position, a size, etc. on the LCD 140 of the keyboard window to the touch key determining section 321. The keyboard presenting section 325 outputs window information to the touch key determining section 321 when, for example, the display position of a keyboard window has been changed.

When receiving data of a keyboard window from the keyboard presenting section 325, the display driver 330 displays the keyboard window on the LCD 140.

Next, keyboards that are displayed by the computer 100 according to the embodiment will be described with reference to FIGS. 4A-4D.

Figure 4A:
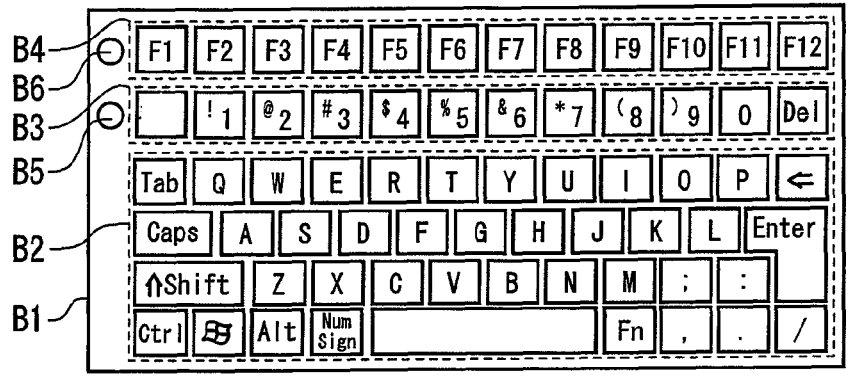
FIGS. 4A-4D show example keyboard images to be displayed by the computer according to the embodiment of the invention.

FIG. 4A shows an example display mode of a basic keyboard window to be displayed by the computer 100. Main key rows B2, a numeral key row B3, a function key row B4, display switching keys B5 and B6, etc. are displayed in a window area B1 of this keyboard window.

The window area B1 is a software keyboard window and its size can be varied according to a user operation or the like. The main key rows B2 are an area where images of alphabet keys for text input, a Tab key, a Caps key, a Shift key, a Ctrl key, an Alt key, a Space key, an Fn key, an Enter key, a Bs key, etc. are displayed. The numeral key row B3 is an area where images of numeral keys, a half-width key, a Del key, etc. are displayed. The function key row B4 is a row of function keys, that is, an area where images of F1-F12 keys etc. are displayed.

The display switching key B5 is a key for receiving an operation for rendering the numeral key row B3 in a non-display state, and is displayed beside the numeral key row B3 approximately on the arrangement line of the keys of the numeral key row B3. The display switching key B6 is a key for receiving an operation for rendering the function key row B4 in a non-display state, and is displayed beside the function key row B4 approximately on the arrangement line of the keys of the function key row B4.

The keys of the main key rows B2, the numeral key row B3, and the function key row B4 are not limited to the above-mentioned keys and may include other keys. Or part of the above-mentioned keys may be omitted. The display switching keys B5 and B6 may be displayed at any positions in the window area B1. However, since the display switching key B5 is a key for rendering the numeral key row B3 in a non-display state, it is preferable that the display switching key B5 be displayed near the numeral key row B3. Likewise, since the display switching key B6 is a key for rendering the function key row B4 in a non-display state, it is preferable that the display switching key B6 be displayed near the function key row B4.

Since the display switching key B5 relates to the numeral key row B3 and the display switching key B6 relates to the function key row B4, it is preferable that the display switching keys B5 and B6 be displayed so as to have a positional relationship corresponding to the positional relationship between the numeral key row B3 and the function key row B4. That is, it is preferable that the display switching key B5 be displayed below the display switching key B6. With this arrangement, the computer 100 allows the user to recognize the functions of the display switching keys B5 and B6 intuitively.

However, the display switching keys B5 and B6 need not always be displayed approximately on the arrangement lines of keys of the numeral key row B3 and the keys of the function key row B4, respectively. For example, the display switching keys B5 and B6 may be displayed above the function key row B4. In this case, in the computer 100, a wider horizontal space can be secured for the keys of the keyboard on the LCD 140 and key images that are longer in the horizontal direction can be displayed.

In the example of FIG. 4A, the display switching keys B5 and B6 are displayed for the numeral key row B3 and the function key row B4, respectively. Alternatively, a single display switching key for rendering both of the numeral key row B3 and the function key row B4 in a non-display state may be displayed.

Figure 4B:
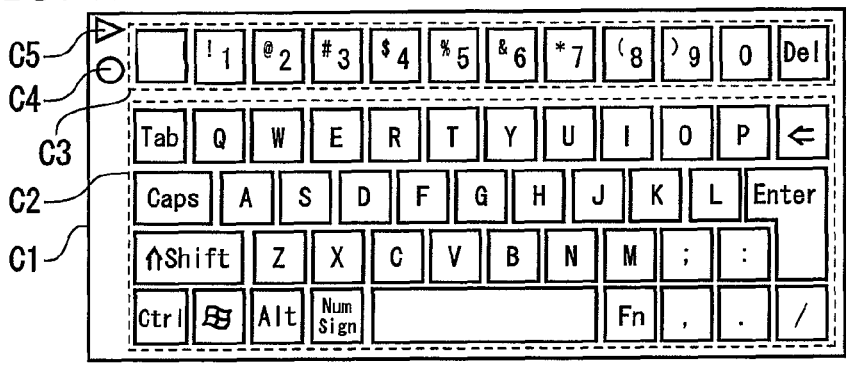

FIG. 4B shows an example display mode of a keyboard window which is different from the keyboard window of FIG. 4A in that the function key row B4 is not displayed. For example, main key rows C2, a numeral key row C3, display switching keys C4 and C5 are displayed in a window area C1 of this keyboard window. The main key rows C2 and the numeral key row C3 correspond to the main key rows B2 and the numeral key row B3 shown in FIG. 4A. Since no function key row is displayed in the window area C1, the main key rows C2 and the numeral key row C3 are longer in the vertical direction than the main key rows B2 and the numeral key row B3. However, it is not always necessary to increase the sizes of both of the main key rows C2 and the numeral key row C3; the size of the main key rows C2 may be increased without increasing the size of the numeral key row C3.

The display switching key C4 is a key for receiving an operation for rendering the numeral key row C3 in a non-display state, and is displayed beside the numeral key row C3. On the other hand, the display switching key C5 is a key for receiving an operation for displaying a function key row which is not displayed currently, and is displayed near the position where a function key row should be displayed when such an operation is made. Since a function key row should be displayed over the numeral key row C3 when the display switching key C5 is operated, the display switching key C5 is displayed above the display switching key C4. To allow the user to recognize the function of the display switching key C5 intuitively, it is preferable that the display switching key C5 be displayed in a different display mode than the display switching keys C4 and B6 for rendering the corresponding key rows in a non-display state.

Figure 4C:
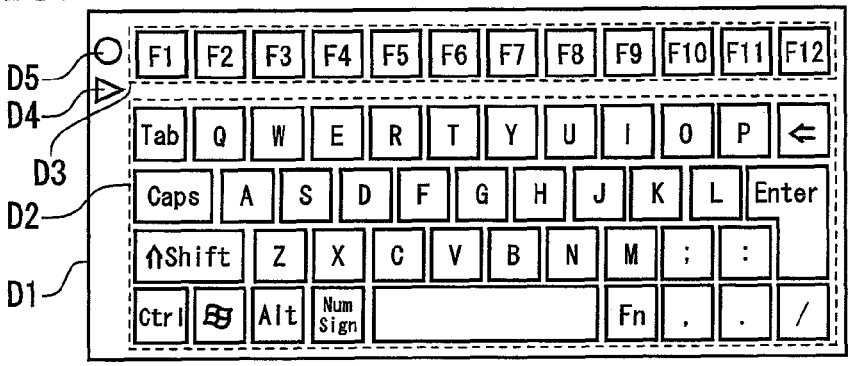

FIG. 4C shows an example display mode of a keyboard window which is different from the keyboard window of FIG. 4A in that the numeral key row B3 is not displayed. For example, main key rows D2, a function key row D3, display switching keys D4 and D5 are displayed in a window area D1 of this keyboard window. The main key rows C2 and the function key row C3, which correspond to the main key rows B2 and the function key row B4 shown in FIG. 4A, are longer in the vertical direction than the main key rows B2 and the numeral key row B4.

The display switching key D4 is a key for receiving an operation for displaying a numeral key row which is not displayed currently, and is displayed near the position where a numeral key row should be displayed when the display switching key D4 is operated. On the other hand, the display switching key D5 is a key for receiving an operation for rendering the function key row D3 in a non-display state, and is displayed beside the function key row D3.

Figure 4D:
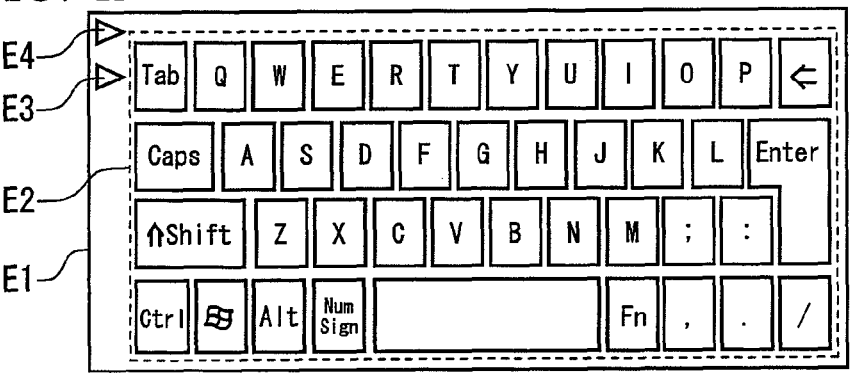

FIG. 4D shows an example display mode of a keyboard window which is different from the keyboard window of FIG. 4A in that the numeral key row B3 and the function key row B4 are not displayed. For example, main key rows E2 and display switching keys E3 and E4 are displayed in a window area E1 of this keyboard window. The main key rows E2, which correspond to the main key rows B2, C2, and D2 shown in FIGS. 4A, 4B, and 4C, respectively, are longer in the vertical direction than the main key rows B2, C2, and D2.

The display switching key E3 is a key for receiving an operation for displaying a numeral key row which is not displayed currently, and is displayed below the display switching key E4. The display switching key E4 is a key for receiving an operation for displaying a function key row which is not displayed currently, and is displayed near the position where a function key row should be displayed when the display switching key E4 is operated.

Figure 5:
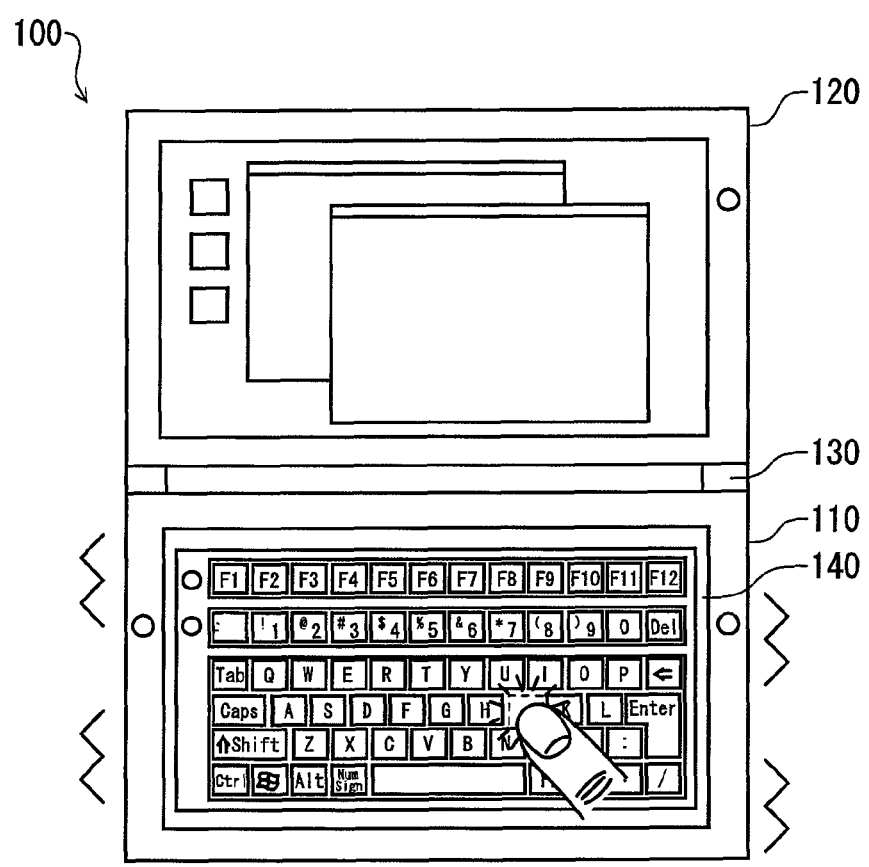
FIG. 5 illustrates a key input reception notifying operation of the computer according to the embodiment of the invention.

Next, an operation which is performed when the computer 100 receives a user operation on a keyboard being displayed on the touch screen display will be described with reference to FIG. 5.

When an operation is received on a key image of a software keyboard being displayed on the LCD 140, the computer 100 displays the image of the operated key in a different display mode than before and notifies the user of the reception of the key operation by vibrating the vibrator 208. More specifically, the computer 100 displays the image of the operated key in such a display mode that its luminance is varied. Alternatively, the computer 100 may change the color, the character form, or the like of the operated key.

As described above, when the touch screen 140A receives an operation on a key of a keyboard being displayed on the LCD 140, the computer 100 can display the operated key in a different display mode than before and notify the user of the reception of the key operation by vibrating the computer 100 itself. Alternatively, the computer 100 may perform one of the processing of changing the display mode of a operated key and the processing of vibrating the computer 100 itself.

Figure 6:
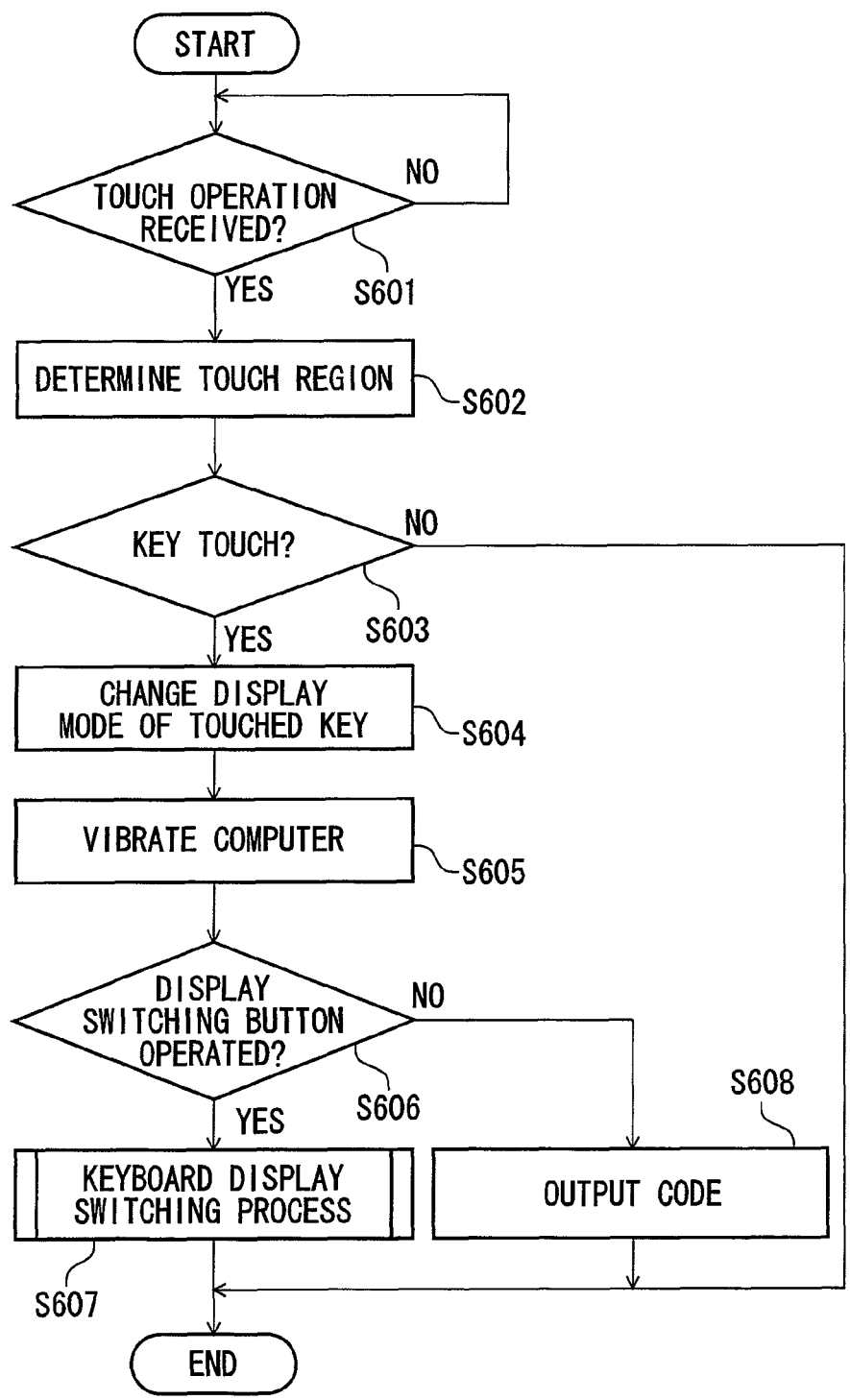
FIG. 6 is a flowchart showing a process which relates to keyboard display and is executed in the embodiment of the invention.

Next, a process which relates to keyboard display etc. and is executed by the computer 100 according to the embodiment will be described with reference to FIG. 6.

First, if received, from the touch screen driver 310, touch region detection information of a touch operation on the touch screen 140A at step S601, at step S602 the touch key determining section 321 determines a key corresponding to the touched region based on the touch region detection information, window information, and key assignment information. If the touched region is not a key region of the keyboard (S603: no), this process which relates to keyboard display is finished.

On the other hand, if the touch operation is on a key of the keyboard (S603: yes), the keyboard presenting section 325 generates a keyboard image in which the image of the key that was determined by the touch key determining section 321 to have been touched by the user is given a different display mode than before, and outputs the generated keyboard image to the LCD 140 via the display driver 330 at step S604 and the vibrator 208 vibrates the computer 100 at step S605.

At step S605, the vibrator 208 can vibrate the computer 100 in a mode that depends on a touch-operated key according to an instruction from the touch key determining section 321. For example, the vibrator 208 can vibrate the computer 100 in different modes when a display switching key for displaying a key row is operated and when a display switching key for rendering a key row in a non-display state. The vibrator 208 may vibrate the computer 100 in different modes when a display switching key is operated and when a key included in the main key rows, the numeral key row, or the function key row is operated.

If the touched region corresponds to a display switching key (S606: yes), at step S607 the computer 100 executes a keyboard display switching process for switching the keyboard image. The keyboard display switching process will be described later with reference to FIG. 7. On the other hand, if the touched region does not correspond to a display switching key (S606: no), at step S608 the code output section 322 outputs a code corresponding to the key of the touched region to the OS 230.

Figure 7:
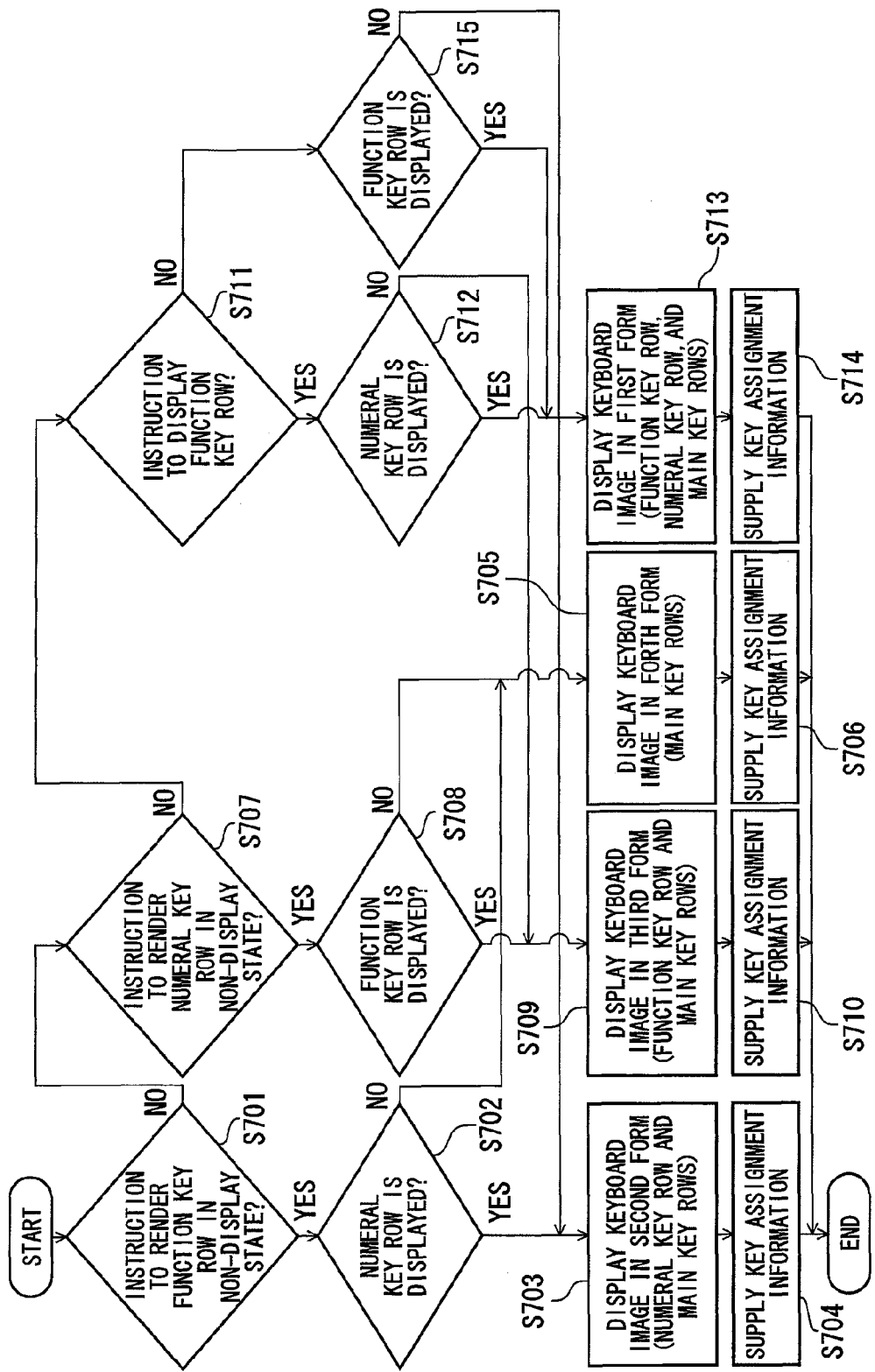
FIG. 7 is a flowchart showing a keyboard display switching process which is executed in the embodiment of the invention.

Next, the keyboard display switching process which is executed by the computer 100 will be described with reference to FIG. 7.

First, if the touch key determining section 321 determines that the display switching key for rendering the function key row in a non-display state has been operated (S701: yes) and if the numeral key row is being displayed (S702: yes), at step S703 the keyboard presenting section 325 displays a keyboard image having a second form as shown in FIG. 4B on the LCD 140 via the display driver 330. At step S704, the keyboard display control section 323 outputs key assignment information of this keyboard image to the touch key determining section 321.

If the numeral key row is not being displayed (S702: no), at step S705 the keyboard presenting section 325 displays a keyboard image having a fourth form as shown in FIG. 4D on the LCD 140. At step S706, the keyboard display control section 323 outputs key assignment information of this keyboard image to the touch key determining section 321.

If determined that the touch operation is not on the display switching key for rendering the function key row in a non-display state (S701: no), the touch key determining section 321 determines at step S707 whether or not the touch operation is on the display switching key for rendering the numeral key row in a non-display state. If the touch operation is on the display switching key for rendering the numeral key row in a non-display state (S707: yes) and the function key row is being displayed (S708: yes), at step S709 the keyboard presenting section 325 displays a keyboard image having a third form as shown in FIG. 4C on the LCD 140. At step S710, the keyboard display control section 323 outputs key assignment information of this keyboard image to the touch key determining section 321.

On the other hand, if the function key row is not being displayed (S708: no), the computer executes steps S705 and S706.

If determined that the touch operation is not on the display switching key for rendering the numeral key row in a non-display state (707: no), the touch key determining section 321 determines at step S711 whether or not the touch operation is on the display switching key for displaying a function key row. If the touch operation is on the display switching key for displaying the function key row (S711: yes) and the numeral key row is being displayed (S712: yes), at step S713 the keyboard presenting section 325 displays a keyboard image having a first form as shown in FIG. 4A on the LCD 140. At step S714, the keyboard display control section 323 outputs key assignment information of this keyboard image to the touch key determining section 321.

On the other hand, if the function key row is not being displayed (S712: no), the computer 100 executes steps S709 and S710.

If it is determined that the touch operation is not on the display switching key for displaying the function key row, that is, the touch operation is on the display switching key for displaying the numeral key row (S711: no), and if the function key row is being displayed (S715: yes), the computer 100 executes steps S713 and S714. On the other hand, is the function key row is not being displayed (S715: no), the computer 100 executes steps S703 and S704.

According to the embodiment, in the computer 100, when the display switching key for rendering, in a non-display state, the function key row or the numeral key row that is not necessary to the user is operated, that key row can be rendered in a non-display state and the images of the main key rows etc. can be enlarged. The user operability can thus be increased. Even in the case where the function key row or the numeral key row is not displayed, the display switching key for displaying the key row that is currently in a non-display state is displayed. And display of that key row is restored upon operation of that display switching key. This measure makes it possible to easily restore display of keys that are necessary to the user.

Since the computer 100 displays a display switching key beside a key row relating to the display switching key, the user can intuitively recognize what key rows respective display switching keys correspond to.

Furthermore, when a key of a keyboard that is displayed on the LCD 140 is operated, the computer 100 changes the display mode of the image of the operated key and can thereby notify the user of the reception of the operation on that key. In addition, the computer 100 generates vibration in a mode corresponding to a operated key, which allows the user to easily recognize what key has been operated.

Although the embodiments according to the present invention have been described above, the present invention may not be limited to the above-mentioned embodiments but can be variously modified. Components disclosed in the aforementioned embodiments may be combined suitably to form various modifications. For example, some of all components disclosed in the embodiments may be removed or may be appropriately combined.

Additional advantages and modifications will readily occur to those skilled in the art. Therefore, the invention in its broader aspects may not be limited to the specific details and representative embodiments shown and described herein. Accordingly, various modifications may be made without departing from the spirit or scope of the general inventive concept as defined by the appended claims and their equivalents.

What is claimed is:

1. An information processing apparatus, comprising:
a reception module configured to receive an operation input; and
a display module configured to display key images for receiving the operation input, the display module
displaying a first key image group comprising one or more key images, a second key image group comprising one or more key images, and first and second display-switching-key images for respectively hiding the first and second key image groups, in a first display mode, and
displaying, while hiding one of the first and second key image groups upon selection of a corresponding one of the first and second display-switching-key images, a non-selected one of the first and second key image groups, in a second display mode to be enlarged more than the first display mode.

2. The apparatus of claim 1,
wherein, when the first or second key image group is not displayed, the display module displays a third or fourth display-switching-key image for respectively displaying the first or second key image group, instead of the first or second display-switching-key image.

3. The apparatus of claim 2,
wherein the display module displays the third or fourth display-switching-key image in a display form different from that of the first or second display-switching-key images.

4. The apparatus of claim 1,
wherein the display module
displays further a third key image group comprising one or more key images in the first display mode, and
displays, while hiding selected one of the first and second key image groups upon selection of corresponding one of the first and second display-switching-key images, at least one of remainder of the first to third key image groups, in a third display mode to be enlarged more than the first display mode.

5. The apparatus of claim 4,
wherein the display module displays
the first key image group comprising a function key image,
the second key image group comprising a numeral key image, and
the third key image group comprising a character input key image.

6. The apparatus of claim 1,
wherein the display module displays the first key image group at an upper position of the second key image group while arranging the first display-switching-key image at an upper position of the second-switching-key image, when displaying the first and second key image groups.

7. The apparatus of claim 1,
wherein the display module
displays the first display-switching-key image so as to be side by side with the first key image group, when displaying the first key image group, and
displays the second display-switching-key image so as to be side by side with the second key image group, when displaying the second key image group.

8. The apparatus of claim 1,
wherein, when the reception module receives the operation input on the key image, the display module displays the operation-input-received key image in a display form different from that before the operation input is received.

9. The apparatus of claim 1,
wherein the reception module receives a touch operation input on an image being displayed by the display module, the apparatus further comprising:
a vibration module configured to vibrate when the touch operation input received by the reception module is inputted on the key image.

10. The apparatus of claim 9,
wherein the vibration module generates different kinds of vibrations correspondingly with the key image on which the touch operation input is received.

11. The apparatus of claim 1, further comprising:
an output module configured to output, when the reception module receives the operation input on the key image, a code corresponding to the operation-input-received key image toward an operating system.

12. The apparatus of claim 1, wherein displaying the first key image group and the second key image group in the first display mode is done in a given display area, and displaying the non-selected one of the first and second key image groups in the second display mode is done in the given display area.

* * * * *